US008776357B2

(12) United States Patent
Hyatt et al.

(10) Patent No.: US 8,776,357 B2
(45) Date of Patent: Jul. 15, 2014

(54) SYSTEM AND METHOD OF SYNCHRONIZED MACHINING

(75) Inventors: Gregory A. Hyatt, South Barrington, IL (US); James Lankford, Elk Grove Village, IL (US); Jeffrey D. Wallace, Belvidere, IL (US)

(73) Assignee: Mori Seiki Co. Ltd, Nara (JP)

( * ) Notice: Subject to any disclaimer, the term of this patent is extended or adjusted under 35 U.S.C. 154(b) by 1010 days.

(21) Appl. No.: 12/769,941

(22) Filed: Apr. 29, 2010

(65) Prior Publication Data

US 2010/0278606 A1 Nov. 4, 2010

Related U.S. Application Data

(60) Provisional application No. 61/215,203, filed on May 4, 2009.

(51) Int. Cl.
*B23B 1/00* (2006.01)

(52) U.S. Cl.
USPC ............... 29/557; 29/27 R; 29/558; 409/132; 82/1.11; 82/118; 82/903

(58) Field of Classification Search
USPC ........ 29/557, 558, 27 R, 27 C; 409/131, 132, 409/1 R; 82/1.11, 151, 118, 903, 904
See application file for complete search history.

(56) References Cited

U.S. PATENT DOCUMENTS

| | | | |
|---|---|---|---|
| 2,887,639 A * | 5/1959 | Dutcher | 318/39 |
| 4,475,421 A * | 10/1984 | Cudnohufsky | 82/138 |
| 4,768,904 A * | 9/1988 | Schmid | 409/262 |
| 4,879,660 A | 11/1989 | Asakura et al. | |
| 5,083,066 A | 1/1992 | Kohari et al. | |
| 5,117,544 A | 6/1992 | Kousaku et al. | |
| 5,173,648 A * | 12/1992 | Kawamura et al. | 318/568.13 |
| 5,175,680 A * | 12/1992 | Yoneda et al. | 700/71 |
| 5,555,178 A * | 9/1996 | Hashimoto | 700/175 |
| 5,775,853 A | 7/1998 | Keefer et al. | |
| 5,832,797 A * | 11/1998 | Cudnohufsky et al. | 82/118 |
| 6,053,676 A | 4/2000 | Garschagen et al. | |
| 6,196,773 B1 | 3/2001 | Hyatt et al. | |
| 6,202,520 B1 * | 3/2001 | Cardemon | 82/1.11 |
| 6,270,295 B1 | 8/2001 | Hyatt et al. | |

(Continued)

FOREIGN PATENT DOCUMENTS

| | | | | |
|---|---|---|---|---|
| JP | 63102817 A * | 5/1988 | | B23C 3/06 |
| JP | 63102818 A * | 5/1988 | | B23C 3/06 |

(Continued)

*Primary Examiner* — David Bryant
*Assistant Examiner* — Jason L Vaughan
(74) *Attorney, Agent, or Firm* — Miller, Matthias & Hull LLP

(57) ABSTRACT

Machine tool systems and methods include methods of synchronizing cutting tools with a workpiece retainer. In some embodiments, the methods and systems provide at least two cutting tools that are synchronized to machine a common surface of a workpiece in a quick and efficient manner. A controller having a single line of code for controlling both cutting tools and the workpiece retainer may be used. The cutting tools may be synchronized such that they engage substantially opposite portions of the workpiece, thereby to reduce resulting forces in the workpiece that may tend to induce workpiece deflection and/or chatter. In other embodiments, a cutting tool is synchronized with a split workpiece holder that may be controlled to induce a compression, tension, or torsion pre-load in the workpiece.

18 Claims, 10 Drawing Sheets

(56) References Cited

U.S. PATENT DOCUMENTS

| | | | |
|---|---|---|---|
| 6,772,659 B2 * | 8/2004 | Antoni et al. | 82/130 |
| 7,682,112 B2 * | 3/2010 | Panczuk et al. | 409/132 |
| 2001/0022920 A1 | 9/2001 | Hyatt et al. | |
| 2001/0034196 A1 | 10/2001 | Hyatt et al. | |
| 2002/0069547 A1 | 6/2002 | Hyatt et al. | |
| 2002/0173247 A1 | 11/2002 | Hyatt | |
| 2003/0086769 A1 | 5/2003 | Hyatt | |
| 2003/0129032 A1 | 7/2003 | Hyatt et al. | |
| 2004/0218987 A1 | 11/2004 | Sheffler et al. | |
| 2005/0047885 A1 | 3/2005 | Hyatt et al. | |
| 2005/0186044 A1 | 8/2005 | Hegde et al. | |
| 2006/0111019 A1 | 5/2006 | Hyatt et al. | |
| 2006/0218764 A1 * | 10/2006 | Hashimoto et al. | 29/27 C |
| 2007/0101837 A1 | 5/2007 | Hyatt et al. | |
| 2008/0025808 A1 | 1/2008 | Hyatt et al. | |
| 2008/0060491 A1 | 3/2008 | Hyatt et al. | |
| 2008/0181736 A1 | 7/2008 | Sheffler et al. | |
| 2008/0213055 A1 | 9/2008 | Ozdyk et al. | |
| 2008/0219781 A1 | 9/2008 | Hyatt et al. | |
| 2008/0220697 A1 | 9/2008 | Hyatt et al. | |
| 2008/0228313 A1 | 9/2008 | Hyatt et al. | |
| 2008/0232909 A1 | 9/2008 | Filho et al. | |
| 2008/0232911 A1 | 9/2008 | Hyatt et al. | |
| 2008/0271581 A1 | 11/2008 | Hyatt et al. | |
| 2009/0095126 A1 | 4/2009 | Hyatt et al. | |
| 2009/0112355 A1 | 4/2009 | Hyatt et al. | |
| 2009/0211338 A1 | 8/2009 | Hyatt et al. | |
| 2009/0279964 A1 | 11/2009 | Hyatt et al. | |
| 2010/0130106 A1 | 5/2010 | Hyatt et al. | |

FOREIGN PATENT DOCUMENTS

| | | | |
|---|---|---|---|
| JP | 01121103 | 5/1989 | |
| JP | 02139101 | 5/1990 | |
| JP | 03287301 | 12/1991 | |
| JP | 04135102 A * | 5/1992 | B23B 1/00 |
| JP | 07-204934 A | 8/1995 | |
| JP | 2000305612 | 11/2000 | |
| JP | 2005125482 | 5/2005 | |
| WO | 0130522 A1 | 5/2001 | |

* cited by examiner

SYSTEM AND METHOD OF SYNCHRONIZED MACHINING

CROSS-REFERENCE TO RELATED APPLICATION

This application claims the benefit of U.S. Provisional Application Ser. No. 61/215,203, filed on May 4, 2009, which is incorporated herein by reference.

BACKGROUND

1. Technical Field

This disclosure generally relates to computed numerically controlled machine tools and related methods.

2. Description of the Related Art

Computed Numerically Controlled (CNC) machine tools are generally known for forming metal and wooden parts. Such machine tools include lathes, milling machines, grinding machines, and other tool types. More recently, machining centers have been developed, which provide a single machine having multiple tool types and capable of performing multiple different machining processes. Machining centers may generally include one or more tool retainers, such as spindle retainers and turret retainers holding one or more tools, and a workpiece retainer, such as a pair of chucks. The workpiece holder may be stationary or move (in translation and/or rotation) while a tool is brought into contact with the workpiece, thereby to remove material from the workpiece.

The machine tool may be required to perform a milling operation to execute certain tool paths through the workpiece. During the milling operation, a milling tool is rotated at relatively high speed about a tool axis and is brought into contact with a stationary or relatively slow moving workpiece. As material is removed from the workpiece, it may have reduced dynamic and/or static stiffness which may lead to excessive deflection or chatter of the workpiece, thereby diverting the milling tool from its intended path.

Additionally, even though conventional machine centers may be capable of using two tools at the same time, they are typically controlled in a manner that is inefficient and overly time consuming. Still further, certain milling operations may require multiple steps, such as an initial step with a first milling tool to perform rough milling, and a second step with a second milling tool to perform finish milling. Current machining center systems and methods may perform these steps sequentially, thereby wasting additional time.

SUMMARY OF THE DISCLOSURE

An apparatus for machining a workpiece may include a workpiece retainer configured to support the workpiece in a machining area, the workpiece retainer being supported for rotation about a C-axis. A first tool retainer may be positioned on a first side of the machining area, the first tool retainer being supported for movement along an X-axis and a Z-axis, and a first cutting tool may be disposed in the first tool retainer. A second tool retainer may be positioned on a second side of the machining area substantially opposite the first side of the machining area, the second tool retainer being supported for movement along an XA-axis substantially parallel to the X-axis and a ZA-axis substantially parallel to the Z-axis, and a second cutting tool disposed in the second tool retainer. A computer control system may include a computer readable medium having computer executable code disposed thereon and be operatively coupled to the workpiece retainer, the first tool retainer, and the second tool retainer. The code may include a single command line for simultaneously controlling movement of the workpiece retainer relative to the C-axis, movement of the first tool retainer relative to the X-axis and the Z-axis, and movement of the second tool retainer relative to the XA-axis and the ZA-axis.

A method of machining a workpiece may include securing a workpiece in a workpiece retainer, the workpiece retainer defining a machining area and being supported for rotation about a C-axis. A first cutting tool may be secured in a first tool retainer disposed on a first side of the machining area, the first tool retainer being supported for movement along an X-axis and a Z-axis, and a second cutting tool may be secured in a second tool retainer disposed on a second side of the machining area substantially opposite the first side of the machining area, the second tool retainer being supported for movement along an XA-axis substantially parallel to the X-axis and a ZA-axis substantially parallel to the Z-axis. Operation of the workpiece retainer, the first tool retainer, and the second tool retainer may be simultaneously controlled with a controller including a single command line for controlling movement of the workpiece retainer relative to the C-axis, movement of the first tool retainer relative to the X-axis, the Y-axis, the Z-axis, and the B-axis, and movement of the second tool retainer relative to the XA-axis and the ZA-axis.

Apparatus for machining a workpiece may include a workpiece retainer supported for rotation and configured to support the workpiece in a machining area, a first tool retainer positioned on a first side of the machining area and movable relative to the workpiece retainer, and a first cutting tool rotatably disposed in the first tool retainer. A second tool retainer may be positioned on a second side of the machining area substantially opposite the first side of the machining area and movable relative to the workpiece retainer, and a second cutting tool may be rotatably disposed in the second tool retainer. A computer control system may include a computer readable medium having computer executable code disposed thereon and be operatively coupled to the workpiece retainer, the first tool retainer, and the second tool retainer. The code may include code for simultaneously controlling rotation of the workpiece retainer, controlling movement of the first tool retainer relative to the machining area to selectively engage the first cutting tool with the workpiece along a first path, and controlling movement of the second tool retainer relative to the machining area to selectively engage the second cutting tool with the workpiece along a second path, wherein the first and second paths are part of a common surface to be formed on the workpiece.

A method of machining a workpiece may include securing the workpiece in a workpiece retainer, the workpiece retainer defining a machining area, securing a first cutting tool in a first tool retainer disposed on a first side of the machining area, and securing a second cutting tool in a second tool retainer disposed on a second side of the machining area substantially opposite the first side of the machining area. Operation of the workpiece retainer, the first tool retainer, and the second tool retainer may be controlled with a controller programmed to simultaneously control rotation of the workpiece retainer, control movement of the first tool retainer relative to the machining area to selectively engage the first cutting tool with the workpiece along a first path, and control movement of the second tool retainer relative to the machining area to selectively engage the second cutting tool with the workpiece along a second path, wherein the first and second paths are part of a common surface to be formed on the workpiece.

An apparatus for machining a workpiece may include a workpiece retainer configured to support the workpiece in a machining area, a first tool retainer positioned on a first side of the machining area and movable relative to the workpiece retainer, a first cutting tool rotatably disposed in the first tool retainer, a second tool retainer positioned on a second side of the machining area substantially opposite the first side of the machining area, the second tool retainer being movable relative to the workpiece retainer, and a second cutting tool rotatably disposed in the second tool retainer. The apparatus may further include a computer control system including a computer readable medium having computer executable code disposed thereon and being operatively coupled to the workpiece retainer, the first tool retainer, and the second tool retainer, the code including code for: causing the first tool retainer to move relative to the workpiece retainer to selectively engage the first cutting tool with a first point on the workpiece, engagement of the first cutting tool with the first point on the workpiece generating a first resulting force in the workpiece; and simultaneously causing the second tool retainer to move relative to the workpiece retainer to selectively engage the second cutting tool with a second point on the workpiece, engagement of the second cutting tool with the second point on the workpiece generating a second resulting force in the workpiece, wherein the second point on the workpiece is selected relative to the first point on the workpiece so that the second resulting force substantially balances the first resulting force.

A method of machining a workpiece may include securing the workpiece in a workpiece retainer, the workpiece retainer defining a machining area, moving a first cutting tool disposed on a first side of the machining area to a first position in which the first cutting tool engages a first point on the workpiece, engagement of the first cutting tool with the first point generating a first resulting force in the workpiece, and simultaneously moving a second cutting tool disposed on a second, substantially opposite side of the machining area to a second position, in which the second cutting tool engages a second point on the workpiece, engagement of the second cutting tool with the second point on the workpiece generating a second resulting force in the workpiece, wherein the second point on the workpiece is selected relative to the first point on the workpiece so that the second resulting force substantially balances the first resulting force.

An apparatus for machining a workpiece may include a workpiece retainer configured to support the workpiece in a machining area that includes a primary support configured to engage a first axial end of the workpiece and a secondary support configured to engage a second, opposite axial end of the workpiece, the primary and secondary supports being supported for rotation about a C-axis. A first tool retainer may be positioned on a first side of the machining area and movable relative to the workpiece retainer, and a first cutting tool may be rotatably disposed in the first tool retainer. A computer control system may include a computer readable medium having computer executable code disposed thereon that is operatively coupled to the workpiece retainer, the first tool retainer, and the second tool retainer. The code may include code for moving the secondary support relative to the primary support to generate a pre-load force in the workpiece, and moving the first tool retainer to a first position in which the first cutting tool engages a first point on the workpiece.

A method of machining a workpiece may include securing the workpiece in a workpiece retainer, the workpiece retainer defining a machining area and including a primary support configured to engage a first axial end of the workpiece and a secondary support configured to engage a second, opposite axial end of the workpiece, moving the secondary support relative to the primary support to generate a pre-load force in the workpiece, and moving a first cutting tool disposed on a first side of the machining area to a first position in which the first cutting tool engages a first point on the workpiece.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Any suitable apparatus may be employed in conjunction with the methods disclosed herein. In some embodiments, the methods are performed using a computer numerically controlled machine, illustrated generally in FIGS. 1-9. A computer numerically controlled machine is itself provided in other embodiments. The machine 100 illustrated in FIGS. 1-9 is an NT-series machine, versions of which are available from DMG/Mori Seiki USA, the assignee of the present application. Other machines may be used in conjunction with the invention.

Figure 1:
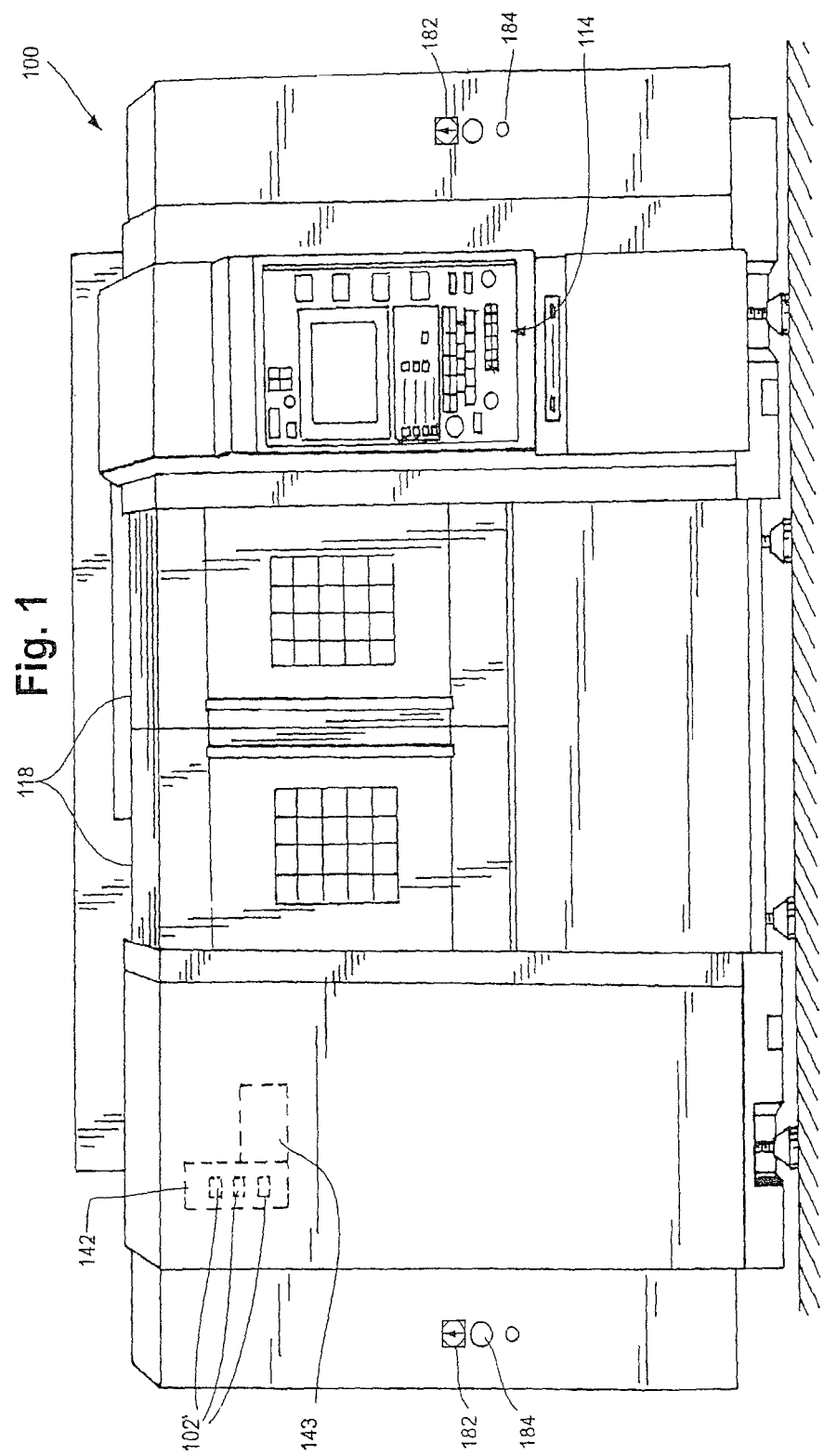
FIG. 1 is a front elevation of a computer numerically controlled machine in accordance with one embodiment of the present invention, shown with safety doors closed.
Figure 2:
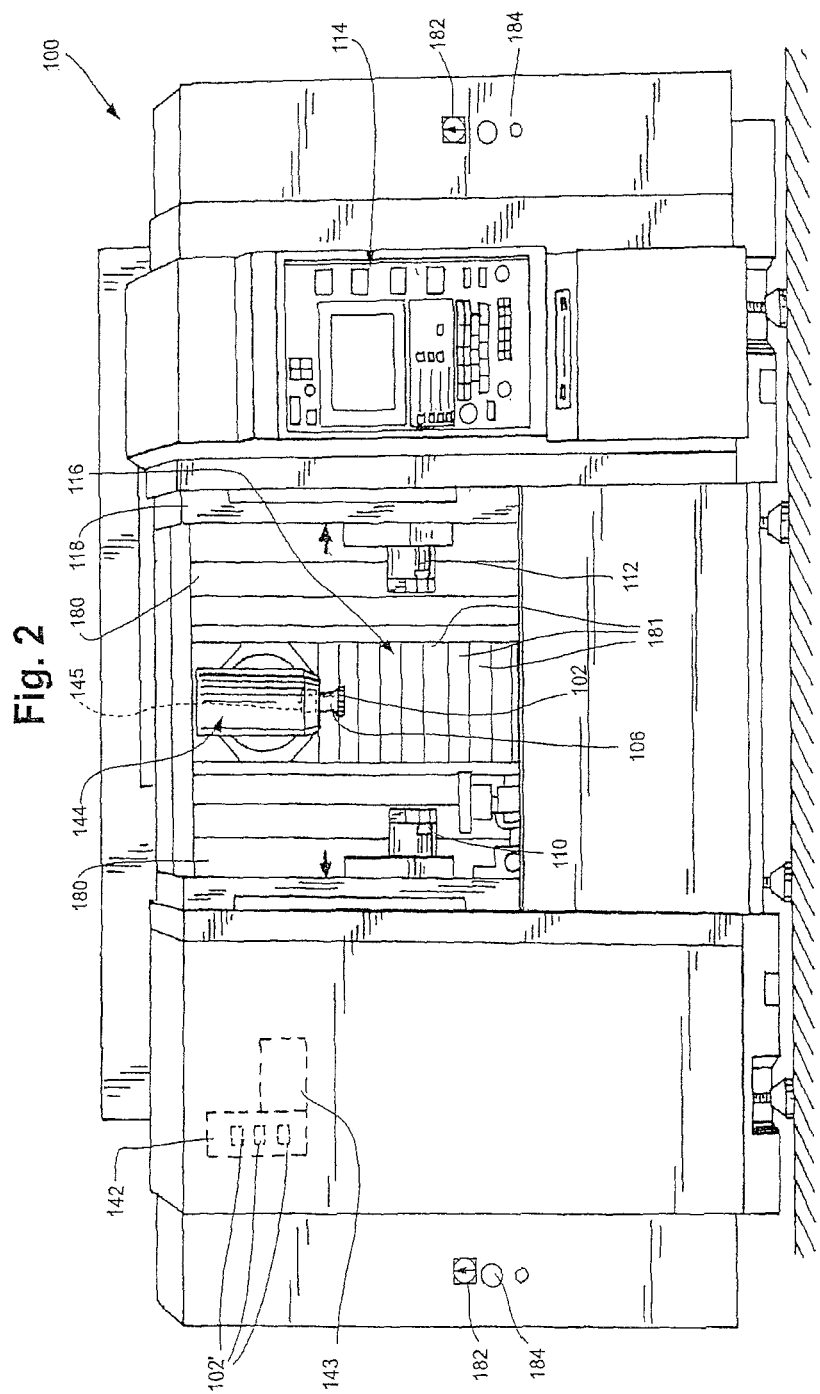
FIG. 2 is a front elevation of a computer numerically controlled machine illustrated in FIG. 1, shown with the safety doors open.
Figure 3:
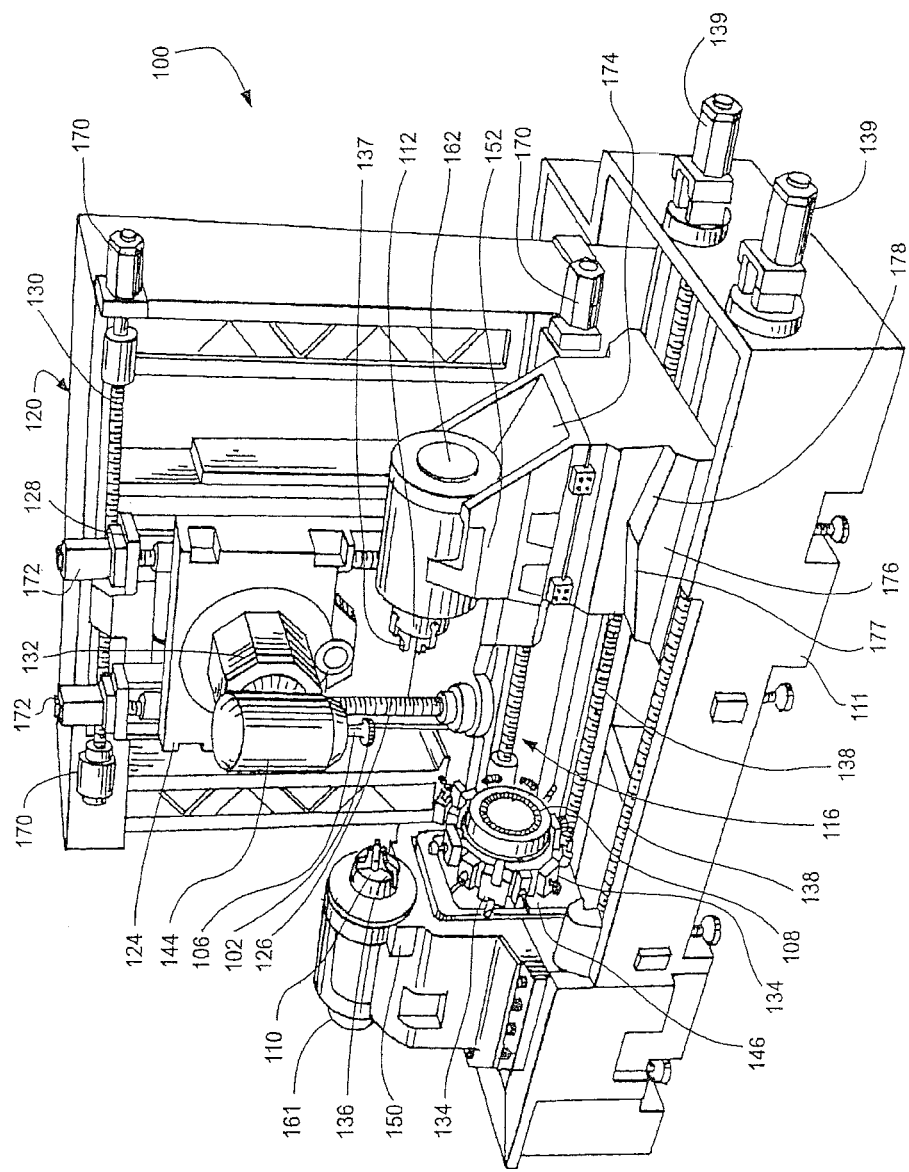
FIG. 3 is a perspective view of certain interior components of the computer numerically controlled machine illustrated in FIGS. 1 and 2, depicting a machining spindle, a first chuck, a second chuck, and a turret.

In general, with reference to the NT-series machine illustrated in FIGS. 1-3, one suitable computer numerically controlled machine 100 has at least a first retainer and a second retainer, each of which may be a tool retainer (such as a spindle retainer associated with spindle 144 or a turret retainer associated with a turret 108) or a workpiece retainer (such as chucks 110, 112). In the embodiment illustrated in the Figures, the computer numerically controlled machine 100 is provided with a spindle 144, a turret 108, a first chuck 110, and a second chuck 112. The computer numerically controlled machine 100 also has a computer control system operatively coupled to the first retainer and to the second retainer for controlling the retainers, as described in more detail below. It is understood that in some embodiments, the computer numerically controlled machine 100 may not contain all of the above components, and in other embodiments, the computer numerically controlled machine 100 may contain additional components beyond those designated herein.

As shown in FIGS. 1 and 2, the computer numerically controlled machine 100 has a machine chamber 116 in which various operations generally take place upon a workpiece (not shown). Each of the spindle 144, the turret 108, the first chuck 110, and the second chuck 112 may be completely or partially located within the machine chamber 116. In the embodiment shown, two moveable safety doors 118 separate the user from the chamber 116 to prevent injury to the user or interference in the operation of the computer numerically controlled machine 100. The safety doors 118 can be opened to permit access to the chamber 116 as illustrated in FIG. 2. The computer numerically controlled machine 100 is described herein with respect to three orthogonally oriented linear axes (X, Y, and Z), depicted in FIG. 4 and described in greater detail below. Rotational axes about the X, Y and Z axes are connoted "A," "B," and "C" rotational axes respectively.

The computer numerically controlled machine 100 is provided with a computer control system for controlling the various instrumentalities within the computer numerically controlled machine. In the illustrated embodiment, the machine is provided with two interlinked computer systems, a first computer system comprising a user interface system (shown generally at 114 in FIG. 1) and a second computer system (not illustrated) operatively connected to the first computer system. The second computer system directly controls the operations of the spindle, the turret, and the other instrumentalities of the machine, while the user interface system 114 allows an operator to control the second computer system. Collectively, the machine control system and the user interface system, together with the various mechanisms for control of operations in the machine, may be considered a single computer control system. In some embodiments, the user operates the user interface system to impart programming to the machine; in other embodiments, programs can be loaded or transferred into the machine via external sources. It is contemplated, for instance, that programs may be loaded via a PCMCIA interface, an RS-232 interface, a universal serial bus interface (USB), or a network interface, in particular a TCP/IP network interface. In other embodiments, a machine may be controlled via conventional PLC (programmable logic controller) mechanisms (not illustrated).

As further illustrated in FIGS. 1 and 2, the computer numerically controlled machine 100 may have a tool magazine 142 and a tool changing device 143. These cooperate with the spindle 144 to permit the spindle to operate with plural cutting tools (shown in FIG. 2 as tools 102'). Generally, a variety of cutting tools may be provided; in some embodiments, multiple tools of the same type may be provided.

The spindle 144 is mounted on a carriage assembly 120 that allows for translational movement along the X- and Z-axis, and on a ram 132 that allows the spindle 144 to be moved in the Y-axis. The ram 132 is equipped with a motor to allow rotation of the spindle in the B-axis, as set forth in more detail hereinbelow. As illustrated, the carriage assembly has a first carriage 124 that rides along two threaded vertical rails (one rail shown at 126) to cause the first carriage 124 and spindle 144 to translate in the X-axis. The carriage assembly also includes a second carriage 128 that rides along two horizontally disposed threaded rails (one shown in FIG. 3 at 130) to allow movement of the second carriage 128 and spindle 144 in the Z-axis. Each carriage 124, 128 engages the rails via plural ball screw devices whereby rotation of the rails 126, 130 causes translation of the carriage in the X- or Z-direction respectively. The rails are equipped with motors 170 and 172 for the horizontally disposed and vertically disposed rails respectively.

The spindle 144 holds the cutting tool 102 by way of a spindle connection and a tool holder 106. The spindle connection 145 (shown in FIG. 2) is connected to the spindle 144 and is contained within the spindle 144. The tool holder 106 is connected to the spindle connection and holds the cutting tool 102. Various types of spindle connections are known in the art and can be used with the computer numerically controlled machine 100. Typically, the spindle connection is contained within the spindle 144 for the life of the spindle. An access plate 122 for the spindle 144 is shown in FIGS. 5 and 6.

The first chuck 110 is provided with jaws 136 and is disposed in a stock 150 that is stationary with respect to the base 111 of the computer numerically controlled machine 100. The second chuck 112 is also provided with jaws 137, but the second chuck 112 is movable with respect to the base 111 of the computer numerically controlled machine 100. More specifically, the machine 100 is provided with threaded rails 138 and motors 139 for causing translation in the Z-direction of the second stock 152 via a ball screw mechanism as heretofore described. To assist in swarf removal, the stock 152 is provided with a sloped distal surface 174 and a side frame 176 with Z-sloped surfaces 177, 178. Hydraulic controls and associated indicators for the chucks 110, 112 may be provided, such as the pressure gauges 182 and control knobs 184 shown in FIGS. 1 and 2. Each stock is provided with a motor (161, 162 respectively) for causing rotation of the chuck.

Figure 5:
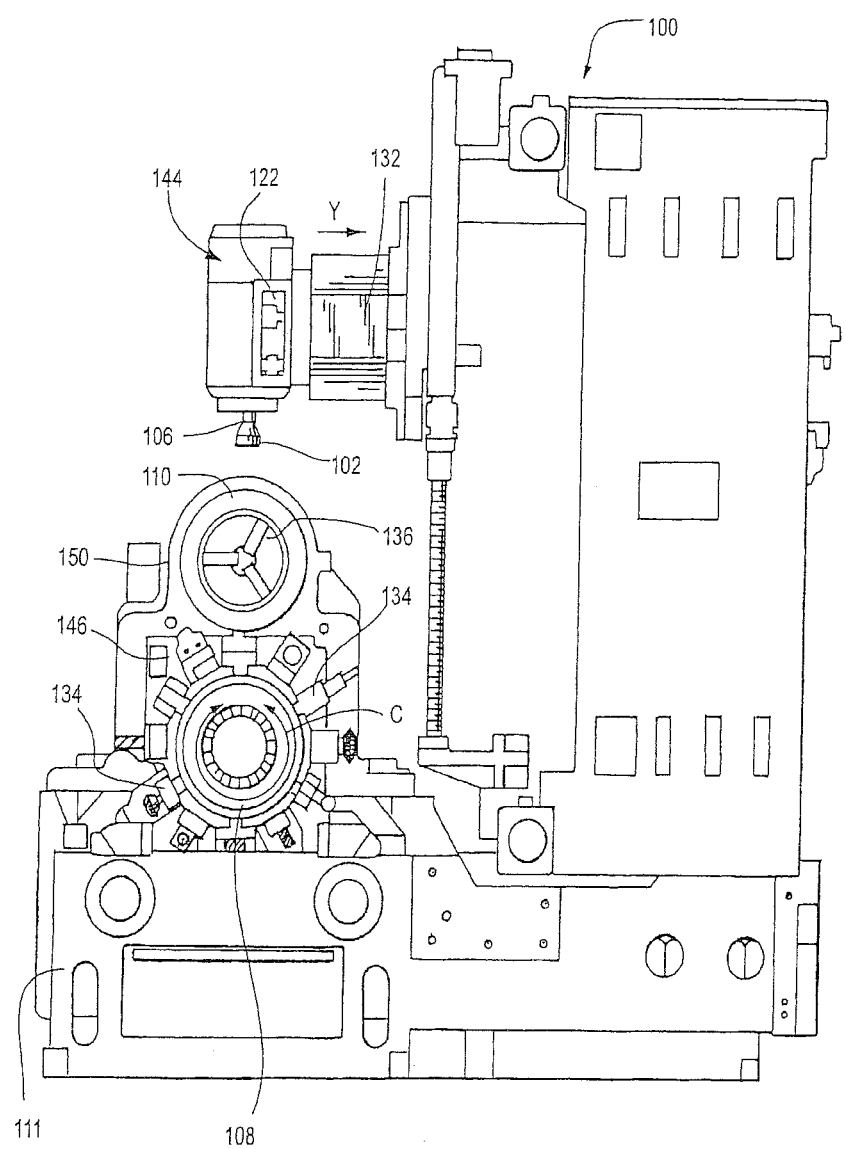
FIG. 5 is a side view of the first chuck, machining spindle, and turret of the machining center illustrated in FIG. 1.
Figure 6:
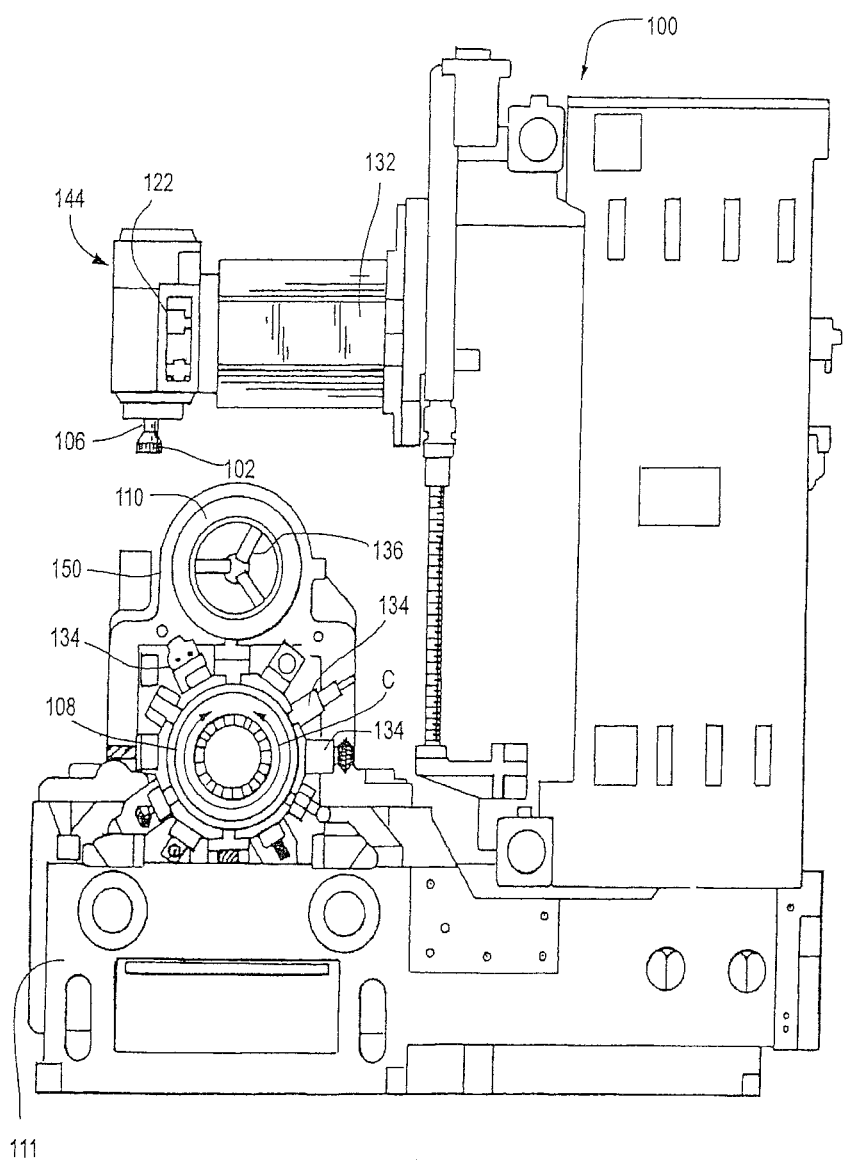
FIG. 6 is a view similar to FIG. 5 but in which a machining spindle has been translated in the Y-axis.
Figure 9:
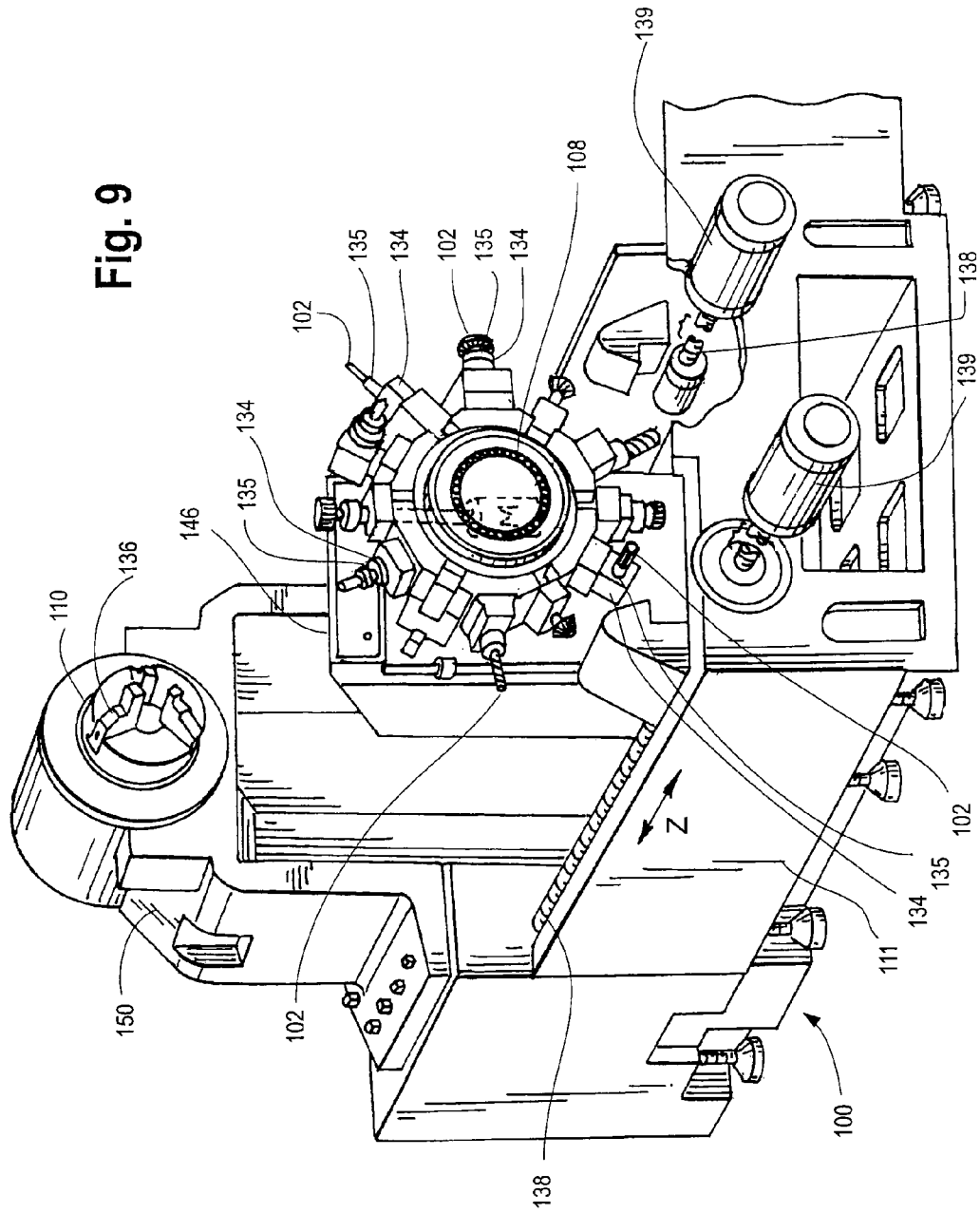
FIG. 9 is a perspective view of the first chuck and turret illustrated in FIG. 2, depicting movement of the turret and turret stock in the Z-axis relative to the position of the turret in FIG. 2.

The turret 108, which is best depicted in FIGS. 5, 6 and 9, is mounted in a turret stock 146 (FIG. 5) that also engages rails 138 and that may be translated in a Z-direction, again via ball-screw devices. The turret 108 is provided with various turret connectors 134, as illustrated in FIG. 9. Each turret connector 134 can be connected to a tool holder 135 or other connection for connecting to a cutting tool. Since the turret 108 can have a variety of turret connectors 134 and tool holders 135, a variety of different cutting tools can be held and operated by the turret 108. The turret 108 may be rotated in a C' axis to present different ones of the tool holders (and hence, in many embodiments, different tools) to a workpiece.

Figure 4:
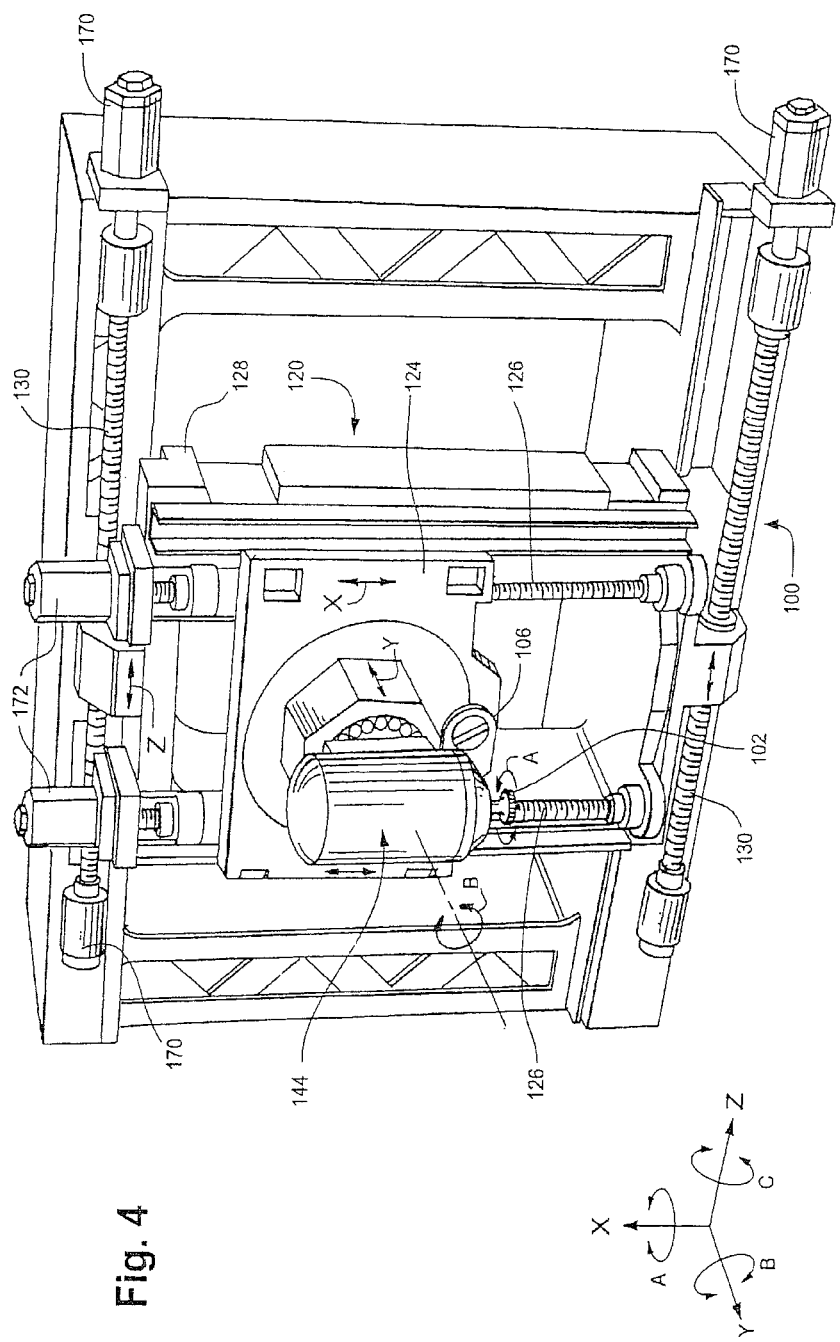
FIG. 4 a perspective view, enlarged with respect to FIG. 3 illustrating the machining spindle and the horizontally and vertically disposed rails via which the spindle may be translated.
Figure 7:
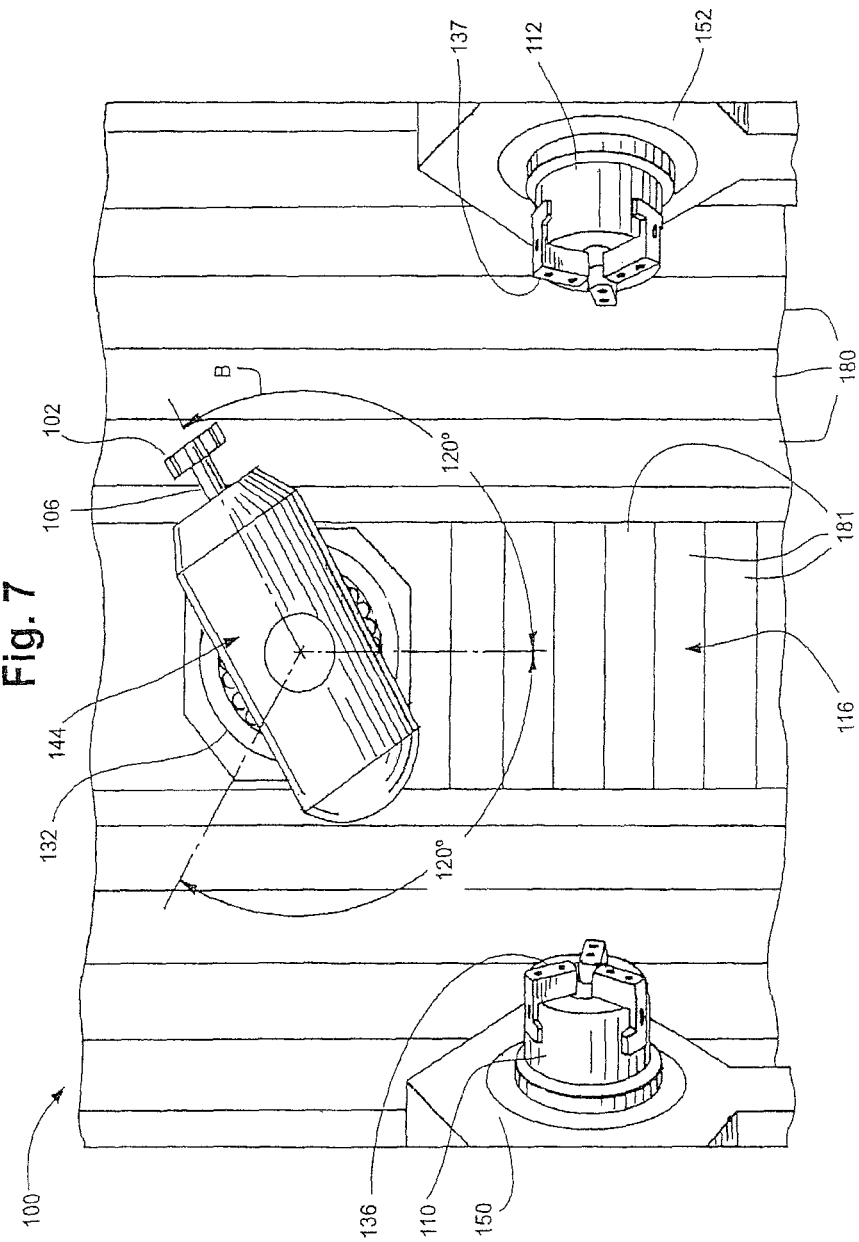
FIG. 7 is a front view of the spindle, first chuck, and second chuck of the computer numerically controlled machine illustrated in FIG. 1, including a line depicting the permitted path of rotational movement of this spindle.
Figure 8:
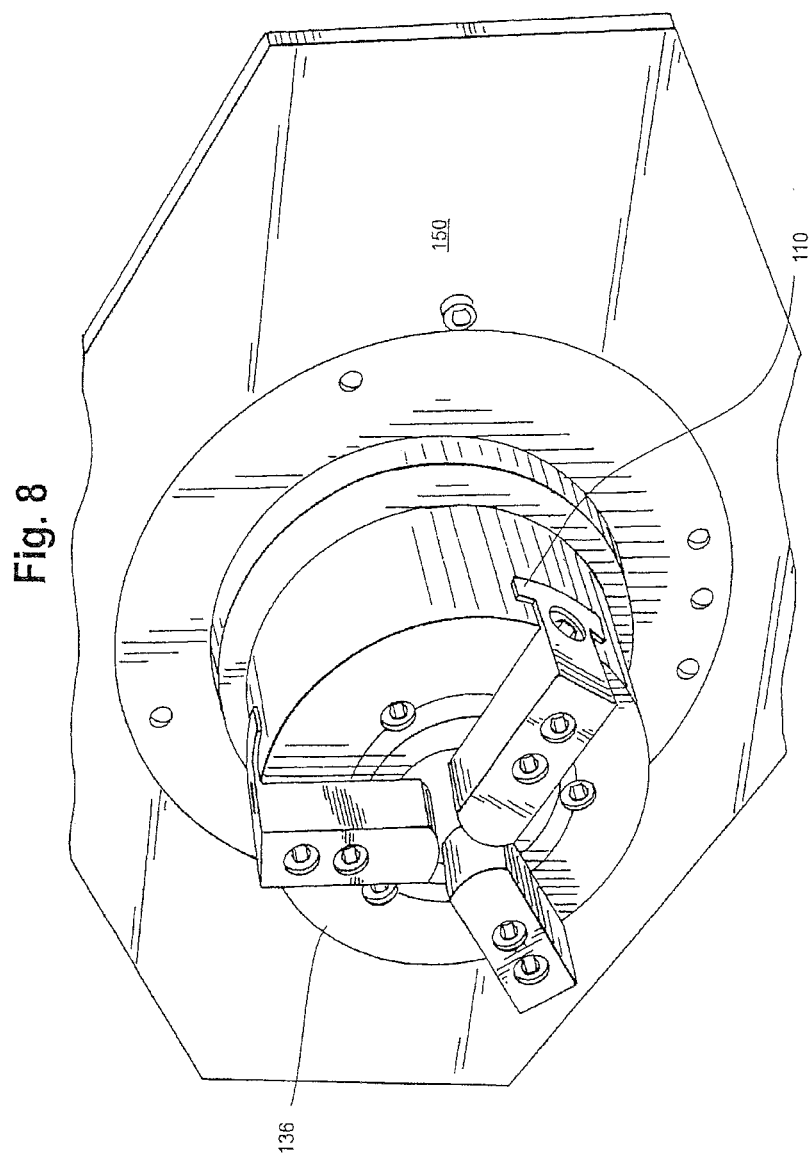
FIG. 8 is a perspective view of the second chuck illustrated in FIG. 3, enlarged with respect to FIG. 3.

It is thus seen that a wide range of versatile operations may be performed. With reference to tool 102 held in tool holder 106, such tool 102 may be brought to bear against a workpiece (not shown) held by one or both of chucks 110, 112. When it is necessary or desirable to change the tool 102, a replacement tool 102 may be retrieved from the tool magazine 142 by means of the tool changing device 143. With reference to FIGS. 4 and 5, the spindle 144 may be translated in the X and Z directions (shown in FIG. 4) and Y direction (shown in FIGS. 5 and 6). Rotation in the B axis is depicted in FIG. 7, the illustrated embodiment permitting rotation within a range of 120 degrees to either side of the vertical. Movement in the Y direction and rotation in the B axis are powered by motors (not shown) that are located behind the carriage 124.

Generally, as seen in FIGS. 2 and 7, the machine is provided with a plurality of vertically disposed leaves 180 and horizontal disposed leaves 181 to define a wall of the chamber 116 and to prevent swarf from exiting this chamber.

The components of the machine 100 are not limited to the heretofore described components. For instance, in some instances an additional turret may be provided. In other instances, additional chucks and/or spindles may be provided. Generally, the machine is provided with one or more mechanisms for introducing a cooling liquid into the chamber 116.

In the illustrated embodiment, the computer numerically controlled machine 100 is provided with numerous retainers. Chuck 110 in combination with jaws 136 forms a retainer, as does chuck 112 in combination with jaws 137. In many instances these retainers will also be used to hold a workpiece. For instance, the chucks and associated stocks will function in a lathe-like manner as the headstock and optional tailstock for a rotating workpiece. Spindle 144 and spindle connection 145 form another retainer. Similarly, the turret 108, when equipped with plural turret connectors 134, provides a plurality of retainers (shown in FIG. 9).

The computer numerically controlled machine 100 may use any of a number of different types of cutting tools known in the art or otherwise found to be suitable. For instance, the cutting tool 102 may be a milling tool, a drilling tool, a grinding tool, a blade tool, a broaching tool, a turning tool, or any other type of cutting tool deemed appropriate in connection with a computer numerically controlled machine 100. As discussed above, the computer numerically controlled machine 100 may be provided with more than one type of cutting tool, and via the mechanisms of the tool changing device 143 and magazine 142, the spindle 144 may be caused to exchange one tool for another. Similarly, the turret 108 may be provided with one or more cutting tools 102, and the operator may switch between cutting tools 102 by causing rotation of the turret 108 to bring a new turret connector 134 into the appropriate position.

Other features of a computer numerically controlled machine include, for instance, an air blower for clearance and removal of chips, various cameras, tool calibrating devices, probes, probe receivers, and lighting features. The computer numerically controlled machine illustrated in FIGS. 1-9 is not the only machine of the invention, but to the contrary, other embodiments are envisioned.

Figure 10:
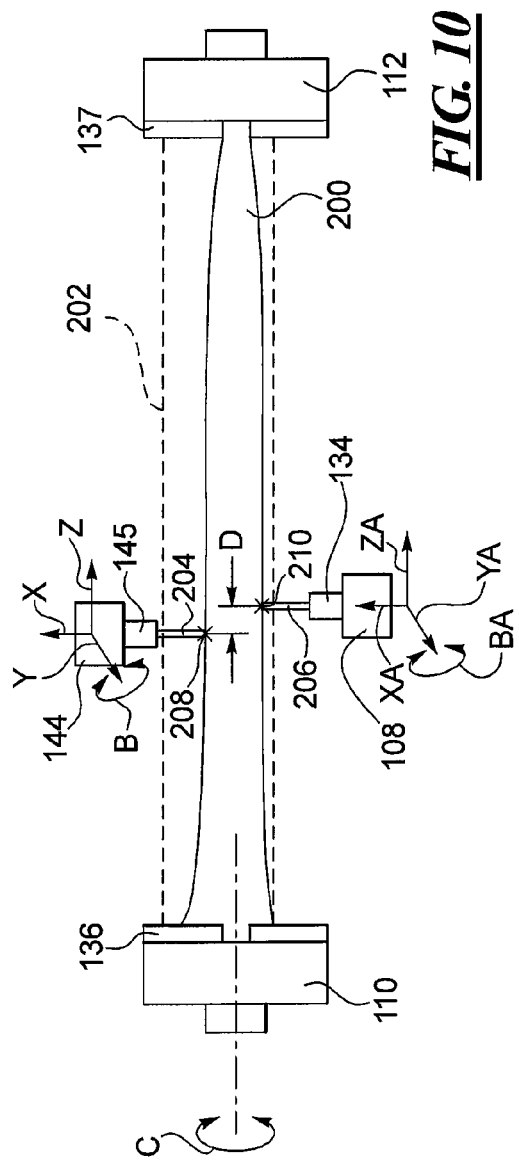
FIG. 10 is a side elevation view of a portion of the computer numerically controlled machine performing a synchronized machining operation.

The computer numerically controlled machine 100 may be configured and controlled to execute machining operations more quickly and efficiently than previously known machines. In an exemplary embodiment, the machine 100 may include code for simultaneously controlling a workpiece holder, a first tool retainer, and a second tool retainer in a synchronized manner. As shown in FIG. 10, opposite ends of a workpiece 200 may be supported by a workpiece retainer in the form of the chucks 110, 112, which define a machining area 202. The chucks 110, 112 may be rotatable about a C-axis. The spindle 144 may provide a first tool retainer carrying a first cutting tool 204. As noted above, the spindle 144 may be movable along an X-axis, a Y-axis, and a Z-axis, and may further be rotated about a B-axis. The turret 108 may provide a second tool retainer carrying a second cutting tool 206. Again, as described in greater detail above, the turret 108 may be movable along an XA-axis substantially parallel to the X-axis and a ZA-axis substantially parallel to the Z axis.

The axes of movement noted above for the spindle 144 and turret 108 are merely exemplary, as they may be movable with respect to fewer or more than the axes identified above.

Exemplary X, Y, Z, A, B, and C axes are shown in FIG. 4. In the illustrated embodiment, the X, Y, and Z axes are orthogonal, while the A, B, and C axes define rotation about the X, Y, and Z axes, respectively. These axes are provided to help describe movement in a three-dimensional space, and therefore other coordinate schemes may be used without departing from the scope of the appended claims. Additionally, use of these axes to describe movement is intended to encompass actual, physical axes that are perpendicular to one another, as well as virtual axes that may not be physically perpendicular but in which the tool path is manipulated by a controller to behave as if they were physically perpendicular.

The computer control system of the machine 100 is operatively coupled to the chucks 110, 112, the spindle 144, and the turret 108, and may include a computer readable medium having computer executable code disposed thereon. The code may include a single command line for simultaneously controlling movement of the chucks 110, 112 relative to the C-axis, movement of the spindle 144 relative to the X-axis, the Y-axis, the Z-axis, and the B-axis, and movement of the turret 108 relative to the XA-axis and the ZA-axis. For example, the single command line may be structured as follows:

$$X[\#500+[123.000]]Y[\#502+[123.000]]Z[\#501+[123.000]]B[\#503+[123.000]]C[\#504+[123.000]]XA[\#505+[123.000]]ZA[\#506+[123.000]]$$ G01 where variables #500-506 allow axis offset control in addition to CAM output. In this structure, the XA and ZA axes are interpolated.

While the exemplary command line provided above simultaneously controls seven axes, it will be appreciated that it may alternatively be structured to control less fewer or additional axes. For example, the second tool retainer (i.e., the turret 108) may further be supported for movement along a YA-axis substantially parallel to the Y-axis and for rotation about a BA-axis substantially parallel to the B-axis. The single command line may accordingly be structured to further control movement of the second tool retainer relative to the YA-axis and BA-axis.

In an additional exemplary embodiment, the computer control system for the CNC machine 100 may be configured and controlled to operate two cutting tools to more quickly execute a single machining step or to simultaneously perform two separate machining steps. For example, the computer control system may include a computer readable medium having computer executable code disposed thereon. The computer control system may be operatively coupled to the workpiece retainer, the first tool retainer, and the second tool retainer. The code may include code for simultaneously controlling rotation of the workpiece retainer; controlling movement of the first tool retainer relative to the machining area to selectively engage the first milling tool with the workpiece along a first path; and controlling movement of the second tool retainer relative to the machining area to selectively engage the second milling tool with the workpiece along a second path. The first and second paths may form parts of a common surface to be formed on the workpiece, and therefore the milling operation may be completed more quickly than with previously known machine centers. Such operation may be particularly advantageous when machining asymmetrical parts, such as the turbine blade illustrated in FIG. 10.

As used above, a "common surface" of a workpiece is a contiguous surface to be formed in the workpiece. At any given time during operation, the first and second milling tools may be contacting the workpiece at separate, spaced areas of the workpiece. When the milling tools have completed their paths, however, the surface formed by the tools will be contiguous.

In yet another exemplary embodiment, the CNC machine 100 may be operated to perform a balanced or pinch milling operation to form parts having reduced static or dynamic stiffness. Previous machine centers operated in a conventional manner may induce deflection and chatter in the workpiece, thereby decreasing precision of the machining operation. The CNC machine 100 described herein, however, may be controlled in a manner that reduces deflection and chatter in the workpiece.

As shown in FIG. 10, opposite axial ends of a workpiece 200 are supported by the chucks 110, 112, respectively, which define the machining area 202. In this embodiment, the intended final configuration of the workpiece 200 is a propeller blade that is relatively long along the Z-axis and has a relatively thin cross-section. Such a final configuration may be susceptible to vibration and chatter during machining.

Figure 11:
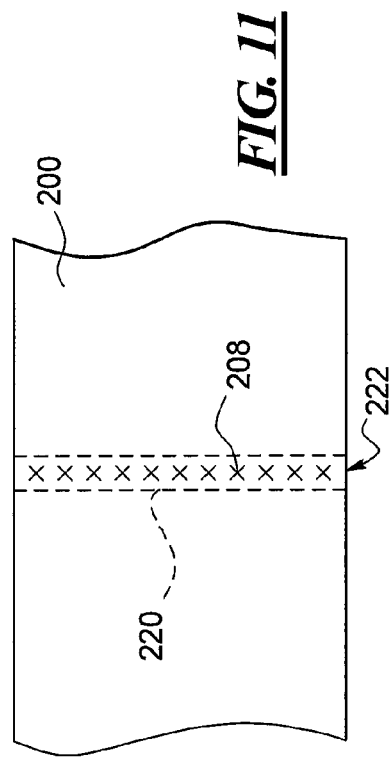
FIG. 11 is an enlarged plan view of a portion of a workpiece showing points along a tool path.

The spindle connection 145 carries a first tool 204, which may be a first milling tool. The first tool 204 is positioned on a first side of the machining area 202, shown in FIG. 10 as being located above the workpiece 200. The spindle 144 is movable relative to the chucks 110, 112, as noted above, and may rotate the first tool 204 when it is provided as a milling tool. When the first tool 204 is brought into contact with the workpiece 200, material is removed from the workpiece. As best shown in FIGS. 10 and 11, the first cutting tool 204 contacts a first point 208 on the workpiece. Engagement of the first cutting tool 204 with the workpiece 200 generates a first resulting force (such as a bending force, a torsion force, a tension force, a compression force, or combinations thereof) in the workpiece 200.

The turret connector 134 carries a second tool 206, which may be a second milling tool. The second tool 206 is positioned on a second, opposite side of the machining area 202, shown in FIG. 10 as being located below the workpiece 200. The turret 108 is movable relative to the chucks 110, 112, as noted above, and may rotate the second tool 206 when it is provided as a milling tool. When the second tool 206 is brought into contact with the workpiece 200, material is removed from the workpiece. As best shown in FIGS. 10 and 11, the second tool 206 contacts a second point 210 on the workpiece 200. Engagement of the second tool 206 with the workpiece 200 also generates a second resulting force (such as a bending force, a torsion force, a tension force, a compression force, or combinations thereof) in the workpiece 200.

The computer numerically controlled machine 100 may be controlled to select the second point 210 relative to the first point 208 to minimize chatter or other deflection in the workpiece 200, thereby to improve accuracy and precision of the machine 100. As best shown in FIG. 10, the second point 210 may be selected so that it is on an opposite face of the workpiece 200 and closely aligned with the first point 208 along a vertical or X-axis. When selected in this manner, the second resulting force in the workpiece 200 generated by the second cutting tool 206 will substantially counteract and balance the first resulting force in the workpiece generated by the first cutting tool 204, thereby reducing deflection of the workpiece 200 during machining.

Accordingly, the computer control system of the CNC machine 100 may include a computer readable medium having computer executable code disposed thereon. The computer control system may be operatively coupled to the chucks 110, 112, the first tool 204 and the second tool 206 and include code for causing the first tool retainer to move relative to the workpiece retainer to selectively engage the first milling tool with a first point on the workpiece, wherein engagement of the first tool with the first point on the workpiece generates a first resulting force in the workpiece. The code may further include code for simultaneously causing the second tool retainer to move relative to the workpiece retainer to selectively engage the second milling tool with a second point on the workpiece, wherein engagement of the second tool with the second point on the workpiece generating a second resulting force in the workpiece. The code may select the second point on the workpiece relative to the first point on the workpiece so that the second resulting force substantially balances the first resulting force Depending on the type of milling operation desired, the milling tools may be precisely aligned or merely closely aligned with a predetermined offset. When both milling tools are of the same type, such as rough milling tools, they may be precisely aligned to minimize the amount of deflection in the workpiece. The use of two tools of the same type may reduce the amount of time needed to perform the machining operation, such as a rough milling step. Alternatively, the tools may be deliberately offset to permit different types of tools to simultaneously operate. As shown in FIG. 10, the second point 210 is offset from the first point 208 by a distance "D" along the Z-axis. As a result, the second cutting tool 206 may be a rough milling tool while the first cutting tool 204 is a finish milling tool. In this embodiment, the first and second cutting tools 204, 206 begin machining at the left axial end of the workpiece 200 and move to the right (as shown in FIG. 10) as they traverse the workpiece 200. Despite the offset between the first and second points 208, 210, the resulting forces are substantially balanced, thereby reducing deflection of the workpiece 200.

Each cutting tool 204, 206 may be operated to traverse a path along the workpiece 200 including multiple points of contact. A path 220 extending along one face of the workpiece 200 may include a set of points 222, as illustrated in FIG. 11. An opposite face of the workpiece 200 may include a second path including a second set of points (not shown). The first and second sets of points may include, respectively, the first and second point 208, 210 noted above. Each point in the second set of points may be selected relative to an associated point in the first set of points so that the first and second resulting forces generated at each corresponding pair of points are substantially balanced as the first and second cutting tools 204, 206 traverse the first and second paths. The chucks 110, 112 may be simultaneously rotated about the C-axis at substantially the same velocity to facilitate quick and efficient positioning of the cutting tool 204, 206 along the paths.

Additionally or alternatively, the chucks 110, 112 may be operated to increase rigidity of the workpiece 200 as it is machined. The chuck 110 may be a primary support for the workpiece 200 while the chuck 112 is a secondary support for the workpiece 200. As shown in FIG. 10, the chucks 110, 112 are aligned along the Z-axis and spaced apart from one another. The chuck 112 may be axially movable along the Z-axis relative to the chuck 110. When the workpiece 200 is supported by the chucks 110, 112, the chuck 112 may be moved toward the chuck 110 to create a compression pre-load. Alternatively, the chuck 112 may be moved away from the chuck 110 to create a tension pre-load. Still further, the chuck 112 may be rotatable about a C-axis relative to the chuck 110 to create a torsion pre-load in the workpiece 200.

As supplied, the apparatus may or may not be provided with a tool or workpiece. An apparatus that is configured to receive a tool and workpiece is deemed to fall within the purview of the claims recited herein. Additionally, an apparatus that has been provided with both a tool and workpiece is deemed to fall within the purview of the appended claims. Except as may be otherwise claimed, the claims are not deemed to be limited to any tool depicted herein.

All references, including publications, patent applications, and patents, cited herein are hereby incorporated by reference. The description of certain embodiments as "preferred" embodiments, and other recitation of embodiments, features, or ranges as being preferred, is not deemed to be limiting, and the claims are deemed to encompass embodiments that may presently be considered to be less preferred. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary embodiments is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. The description herein of any reference or patent, even if identified as "prior," is not intended to constitute a concession that such reference or patent is available as prior art against the present disclosure.

What is claimed is:

1. A method of machining a workpiece, comprising:
    securing the workpiece in a workpiece retainer, the workpiece retainer defining a machining area and being supported for rotation about a C-axis;
    securing a first cutting tool in a first tool retainer disposed on a first side of the machining area, the first tool retainer being supported for movement along an X-axis and a Z-axis;
    securing a second cutting tool in a second tool retainer disposed on a second side of the machining area substantially opposite the first side of the machining area, the second tool retainer being supported for movement along an XA-axis substantially parallel to the X-axis and a ZA-axis substantially parallel to the Z-axis;
    simultaneously controlling operation of the workpiece retainer, the first tool retainer, and the second tool retainer with a controller including a single command line for controlling movement of the workpiece retainer relative to the C-axis, movement of the first tool retainer relative to the X-axis and the Z-axis, and movement of the second tool retainer relative to the XA-axis and the ZA-axis, wherein the first and second tool retainers are controlled so that the respective first and second cutting tools simultaneously engage the workpiece.

2. The method of claim 1, in which the first cutting tool comprises a first milling tool and in which the second cutting tool comprises a second milling tool.

3. The method of claim 1, in which the first tool retainer is further supported for movement along a Y-axis, and in which the single command line further controls movement of the first tool retainer relative to the Y-axis.

4. The method of claim 3, in which the second tool retainer is further supported for movement along a YA-axis substantially parallel to the Y-axis, and in which the single command line further controls movement of the second tool retainer relative to the YA-axis.

5. The method of claim 4, in which the first tool retainer is further supported for B-axis rotation about the Y-axis, and in which the single command line further controls B axis rotation of the first tool retainer.

6. The method of claim 5, in which the second tool retainer is further supported for BA-axis rotation about the YA-axis, and in which the single command line further controls BA-axis rotation of the second tool retainer.

7. A method of machining a workpiece, comprising:
    securing the workpiece in a workpiece retainer, the workpiece retainer defining a machining area;
    securing a first cutting tool in a first tool retainer disposed on a first side of the machining area;
    securing a second cutting tool in a second tool retainer disposed on a second side of the machining area substantially opposite the first side of the machining area;
    controlling operation of the workpiece retainer, the first tool retainer, and the second tool retainer with a controller programmed with a single command line configured to simultaneously:
    control rotation of the workpiece retainer;
    control movement of the first tool retainer relative to the machining area to selectively engage the first cutting tool with the workpiece along a first path; and
    control movement of the second tool retainer relative to the machining area to selectively engage the second cutting tool with the workpiece along a second path, wherein the first and second paths are part of a common surface to be formed on the workpiece;
    wherein the first and second tool retainers are controlled so that the respective first and second cutting tools simultaneously engage the workpiece.

8. The method of claim 7, in which the controller comprises a single command line for controlling rotation of the workpiece retainer, movement of the first tool retainer, and movement of the second tool retainer.

9. The method of claim 7, in which the common surface is asymmetrical.

10. The method of claim 7, in which the first cutting tool comprises a first milling tool and in which the second cutting tool comprises a second milling tool.

11. A method of machining a workpiece, comprising:
    securing the workpiece in a workpiece retainer, the workpiece retainer defining a machining area and having a primary support configured to engage a first axial end of the workpiece and a secondary support configured to engage a second, opposite axial end of the workpiece;
    rotating the secondary support about a C-axis relative to the primary support to a rotated position, wherein the rotated position is based on a desired torsion force on the workpiece;
    moving a first cutting tool disposed on a first side of the machining area to a first position in which the first cutting tool engages a first point on the workpiece, engagement of the first cutting tool with the first point generating a first resulting force in the workpiece;
    simultaneously moving a second cutting tool disposed on a second, substantially opposite side of the machining area to a second position, in which the second cutting tool engages a second point on the workpiece, engagement of the second cutting tool with the second point on the workpiece generating a second resulting force in the workpiece, wherein the second point on the workpiece is selected relative to the first point on the workpiece so that the second resulting force substantially balances the first resulting force.

12. The method of claim 11, in which the first point on the workpiece is one of a first set of points defining a first path along the workpiece and the second point on the workpiece is one of a second set of points defining a second path along the workpiece, and in which the method further includes selectively engaging the first cutting tool along the first path and selectively engaging the second cutting tool along the second path, wherein each point in the second set of points is selected relative to a associated point in the first set of points so that the first and second resulting forces are substantially balanced as the first and second cutting tools traverse the first and second paths, respectively.

13. The method of claim 11, further comprising rotating the workpiece retainer about a C-axis simultaneously as the first and second cutting tools are moved to the first and second positions, respectively.

14. The method of claim 11, in which the second position of the second cutting tool is offset from the first position of the first cutting tool along a Z-axis.

15. The method of claim 14, in which the first cutting tool comprises a rough milling tool and the second cutting tool comprises a finish milling tool.

16. A method of machining a workpiece, comprising:
securing the workpiece in a workpiece retainer, the workpiece retainer defining a machining area and including a primary support configured to engage a first axial end of the workpiece and a secondary support configured to engage a second, opposite axial end of the workpiece;
rotating the secondary support about a Z-axis relative to the primary support to generate a pre-load torsion force in the workpiece; and
moving a first cutting tool disposed on a first side of the machining area to a first position in which the first cutting tool engages a first point on the workpiece.

17. The method of claim 16, further comprising rotating the primary and secondary supports at substantially a same rotational velocity simultaneously as the first cutting tool is moved to the first position.

18. The method of claim 16, further comprising moving a second cutting tool, disposed on a second side of the machining area substantially opposite the first side of the machining area, to a second position in which the second cutting tool engages a second point on the workpiece.

* * * * *